(12) United States Patent
Priyadarshi et al.

(10) Patent No.: US 8,289,338 B2
(45) Date of Patent: Oct. 16, 2012

(54) SYSTEMS AND METHODS FOR FONT FILE OPTIMIZATION FOR MULTIMEDIA FILES

(75) Inventors: Shaiwal Priyadarshi, San Diego, CA (US); Kourosh Soroushian, San Diego, CA (US); Jason Braness, San Diego, CA (US); Jim Reesman, San Diego, CA (US)

(73) Assignee: DIVX, LLC, Santa Clara, CA (US)

( * ) Notice: Subject to any disclaimer, the term of this patent is extended or adjusted under 35 U.S.C. 154(b) by 800 days.

(21) Appl. No.: 12/480,276

(22) Filed: Jun. 8, 2009

(65) Prior Publication Data

US 2009/0303241 A1 Dec. 10, 2009

Related U.S. Application Data

(60) Provisional application No. 61/059,547, filed on Jun. 6, 2008, provisional application No. 61/109,476, filed on Oct. 29, 2008.

(51) Int. Cl.
*G09G 5/22* (2006.01)
*G06T 11/00* (2006.01)

(52) U.S. Cl. ........................................ 345/551; 345/467

(58) Field of Classification Search ........................ None
See application file for complete search history.

(56) References Cited

U.S. PATENT DOCUMENTS

| | | |
|---|---|---|
| 2005/0196147 A1 | 9/2005 | Seo et al. |
| 2006/0168639 A1 | 7/2006 | Gan et al. |
| 2006/0267986 A1 | 11/2006 | Bae |
| 2008/0120330 A1 | 5/2008 | Reed et al. |
| 2008/0120342 A1 | 5/2008 | Reed et al. |

FOREIGN PATENT DOCUMENTS

| | | |
|---|---|---|
| EP | 1420580 A1 | 5/2004 |
| EP | 1718074 A1 | 11/2006 |
| WO | 2004/054247 A1 | 6/2004 |

OTHER PUBLICATIONS

International Search Report for International Application No. PCT/US 09/46588, date completed Jul. 13, 2009, date mailed Jul. 23, 2009, 2 pgs.
Written Opinion of the International Searching Authority for International Application No. PCT/US 09/46588, date completed Jul. 14, 2009, date mailed Jul. 23, 2009, 5 pgs.
"Text of ISO/IEC 14496-18/COR1", ITU Study Group 16—Video Coding Experts Group—ISO/IEC MPEG & ITU-T VCEG(ISO/IEC JTC1/SC29/WG11 and ITU-T SG16 06), No. N8664, Nov. 7, 2006, 3 pgs.
"Text of ISO/IEC 14496-18/FDIS", ITU Study Group 16—Videocoding Experts Group—ISO/IEC MPEG & ITU-T VCEG(ISO/IEC JTC1/SC29/WG11 and ITU-T SG16 06), No. N6215, Jan. 7, 2004.
Nee, A. "Matroska File Format", Retrieved from the Internet: URL:http://web.archive.org/web/20070821155146/www.matroska.org/technical/specs/matroska.pdf [retrieved on Jan. 19, 2011], Jun. 24, 2007, 1-51.
European Supplementary Search Report for Application EP09759600, completed Jan. 25, 2011, 11 pgs.
International Search Report for International Application No. PCT/US2009/46588, date completed Jul. 13, 2009, date mailed Jul. 23, 2009, 2 pgs.
Written Opinion of the International Searching Authority for International Application No. PCT/US2009/46588, date completed Jul. 14, 2009, date mailed Jul. 23, 2009, 5 pgs.

*Primary Examiner* — Ryan R Yang
(74) *Attorney, Agent, or Firm* — Kauth, Pomeroy, Peck & Bailey LLP

(57) ABSTRACT

Methods and systems of generating and displaying textual information for a multimedia file are provided. An optimized font file is created that matches the text data of the multimedia file and optionally a number of predetermined text characters. The optimized font file may also be further configured to conform to a specific memory and/or timing constraint.

25 Claims, 6 Drawing Sheets

SYSTEMS AND METHODS FOR FONT FILE OPTIMIZATION FOR MULTIMEDIA FILES

CROSS REFERENCE TO RELATED APPLICATIONS

This application claims the benefit of U.S. Provisional Patent Application Nos. 61/059,547, filed on Jun. 6, 2008, and 61/109,476, filed on Oct. 29, 2008, the entire disclosures of which are hereby incorporated by reference as if set in full herein.

BACKGROUND

The present invention generally relates to multimedia files with audio, video and textual data and in particular relates to optimizing font files for multimedia files.

Presentation of textual information can be an important part of the video viewing experience. Text information may be used to represent the movie title, chapter names, specific track data, as well as subtitles. Subtitles may be used for conveying the dialogue of a video presentation in different languages, to aid those with hearing impairments, poor listening comprehension, or to suit the viewer's current listening preferences and at times to present the director or even user commentary in environments where such information is available.

Typically, embedding textual information such as subtitles with audio and video data into multimedia files involves run-length-encoding bitmap images of the subtitle text information. The run-length encoding of bitmaps provides an efficient way of storing the information, and since bitmaps are a pictorial representation of the text rather than a textual representation, there are no additional requirements to render the subtitles, such as utilizing embedded or resident font files. However, despite its advantages, because the text information is stored as bitmaps, it adapts poorly to changes in image frame size and as a result cannot be scaled with acceptable visual results to multiple sizes. In addition to the problem with scalability, bitmap representations are not easily searchable as text, which is an attractive feature from the perspective of categorization, metadata and archival activities.

The use of the actual text with respect to a known alphabet of a particular language to represent the textual information, e.g., a title, chapter names, and/or a dialogue in a movie, is one alternative to using bitmaps to represent the information. Using text in a movie typically requires the encoding of the text in a commonly acceptable representation. ASCII and Unicode are two such representations, where ASCII is typically used for encoding European languages and allows a maximum of 256 symbols, and Unicode is used for representing over 100,000 characters and other symbols from a very comprehensive list of world languages.

The displaying of such text can be done through the use of a mixture of bitmap and non-bitmap image representations such as those stored in True Type Font files. However, the size of these representations may pose a problem especially when dynamically displayed or utilized with languages that utilize unique symbols to represent each individual word in their corresponding vocabularies.

Accordingly, there is a need to provide an optimized text generation and display system that overcomes the above-noted issues and/or additional problems in the art.

SUMMARY

Generally, textual information creation and playback systems and methods for multimedia files are provided in which one or more optimized font files are utilized. In one embodiment, a method of generating textual information for a multimedia file comprises receiving text data, an original font file and a multimedia file having audio and video data by a processor; and generating an optimized font file from the text data and the original font file by the processor. The generated font file is specifically matched to the text data and different from the original font file.

In another embodiment, a method of generating textual information for a multimedia file comprises identifying a plurality of time segments of a multimedia file having audio and video data by a processor; and generating a plurality of font files by the processor from text data and an original font file Each generated font file is specifically matched to the text data for each identified time segment.

In yet another embodiment, a textual information rendering system for generating textual information for a multimedia file is provided. The system includes a general purpose processor and a demultiplexer that is configured to extract text data from a multimedia file having audio data and video data. The processor is configured to create a font file by processing the text data together with an original font file, with the generated font file being specifically matched to the extracted text data and at least one predetermined character. Memory is coupled to the processor and stores the generated font file.

In various embodiments, the text data may be provided as either separate file(s), to be incorporated into the multimedia file The above-mentioned and other features of this invention and the manner of obtaining and using them will become more apparent, and will be best understood, by reference to the following description, taken in conjunction with the accompanying drawings. The drawings depict only typical embodiments of the invention and do not therefore limit its scope.

DETAILED DESCRIPTION

Figure 1:
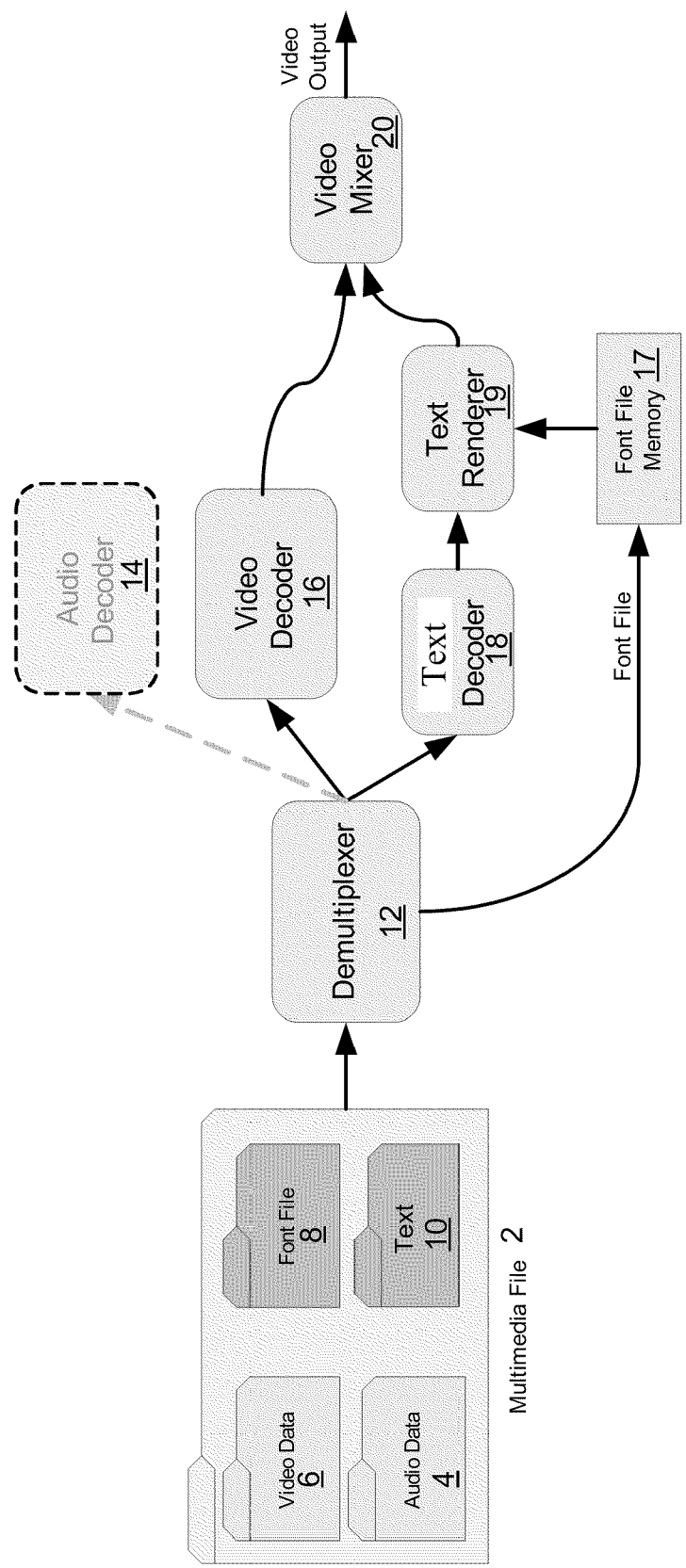
FIG. 1 is a block diagram of a multimedia textual information generation and playback system in accordance with various embodiments of the present invention.

Generally, a multimedia textual information generation and playback system is provided that includes optimized font files for textual information. The font files are substantially reduced in file size relative to an original font file. The font files are specifically tailored to supply only the characters or words needed for a specific title of the multimedia file. In one embodiment, the font files are designed to accommodate a particular size and/or time frame relative to the multimedia file. In various embodiments, the font files are provided or are configured to be provided dynamically during the playback of the multimedia file. In various embodiments, multimedia textual information generation and/or playback systems and methods are provided to generate/display textual information that is searchable, scalable and/or reduces space requirements.

There are many methods for embedding textual information such as subtitles alongside the audio and video tracks of a video presentation. These methods include but are not limited to: still-frame images such as JPEG files, run-length-encoded bitmap images, and the direct embedding of the text along with the optional attachment of a font file suitable for displaying the subtitle characters. It should be noted that although subtitle data or information is used as an example throughout the application, this is merely an example of textual information to ease the description of the invention and should not be construed as limiting such information or the applicability thereof only to subtitles.

As will be discussed in greater detail below, for a personal computer or a consumer electronic device, font files are used to render the text or characters to be displayed. Font files are electronic data files containing a set of representations for displaying characters or symbols. These representations or glyphs may be made in the form of individual bitmaps, drawing instructions for mathematical formulas for specifying the outline of a character, or instructions on drawing a series of lines with specific sizes and shapes. The advantage of specifying the glyph shape using drawing instructions and mathematical formulas is that the size of the character representation may be scaled to different sizes while generally maintaining their intended shape of the character. A font may also be composed of a mixture of bitmap and non-bitmap glyphs, where bitmap specifications could be used for only depicting certain character sizes.

Additionally, some languages, such as Chinese, Japanese, and Korean, utilize a unique symbol for representing each individual word in their corresponding vocabularies. The large number of words making up these different languages leads to very large font files as compared to languages which utilize combination of letters in a unique alphabet to form words. Font files for these languages may be in the 1 to 10 Mbytes range, and can sometimes be as large as 30 Mbytes. While the size of these fonts may not be an issue for processing on a personal computer, in an embedded or a consumer electronic device, such large font sizes may pose a problem especially if the fonts are expected to be dynamically available in memory for the device's rendering engine. When the size of the required representation file exceeds the resource handling capability of an embedded device, the behavior exhibited by these devices and the resulting user-experience may be non-uniform.

As will be described in greater detail below, efficient methods and systems are provided in which a standard font file for any language is customized to a specific multimedia file, e.g., a movie, such that only those characters that are present in the actual textual elements used by that movie are included in one or more font files. This optimization is expected to reduce the amount of data necessary for each font file as compared to the original font file. While these reductions in absolute terms may appear small relative to the overall high-resolution video file sizes, the impact of the reduction is significant because an entire font file can be available during playback in the local memory of the playback device. This optimization is then further extended for even more limited memory conditions, where smaller font files can be optionally generated for a single movie subtitle, where the fonts files may be dynamically loaded based on the progression of the video and/or audio timeline.

Referring now to the drawings, in FIG. 1, textual information 10 together with a corresponding font file 8 from a multimedia file 2 having audio data 4 and video data 6 are separated or extracted by a de-multiplexer 12. The de-multiplexer supplies the appropriate data to the corresponding decoder. As such, audio data is supplied to an audio decoder 14, video data to a video decoder 16 and text data to a text decoder 18.

The font file in one embodiment is stored in memory 17 for access by a text-rendering module 19. It should be appreciated that for a successful presentation of the text data, a complete representation of all the characters of the text is provided by the font file. For example, when considering subtitles for specific languages, the font files can be very large as such languages can require a representation in the font file for each individual word. Also, since in many environments it cannot be assumed that the playback system has an existing and efficient way of representing such specific fonts, a large amount of memory may be required to host these fonts during the movie playback.

The rendering module utilizes the decoded text data and the retrieved or accessed font file from memory to provide selected text data along with the decoded video to be combined by a video mixer 20. The combined video is supplied to a display device, stored, transmitted or otherwise provided to be displayed at a later time. In the illustrated embodiment, the font file supplied with the multimedia file is an optimized font file. In other various embodiments, an optimized font file is generated from a font file supplied with the multimedia file and the decoded text data.

The optimized font file contains only the representations that are required for rendering the particular characters used by the different textual elements of an individual multimedia file, e.g., the subtitle information of an individual movie. The representations used in the font may be in form of bitmaps, instructions, mathematical formulas, or other similar techniques utilizing the font file to render the characters in the textual elements of the multimedia presentation. A single textual element may have many unique optimized font files associated with it as required to support the different languages of a multimedia title. In addition to support for different languages, customized and optimized font files may also be created for different stylistic variations (e.g. bold, italics) of a single font. In one embodiment, some implementations include a set of predetermined characters, in addition to the unique characters used by the textual elements of a movie, to be represented by the optimized font file.

However, by limiting the total number of characters to those only used by the multimedia file, e.g., a movie's subtitles, a font file is created that is specifically designed for use by that individual movie, where this font file would not be expected to correctly render the text of another movie. Such tailoring thus reduces the size of the one or more font files, especially in the case of languages that textual characters represent individual words used by the different elements in the multimedia presentation, e.g., the dialogue of the movie. The one or more optimized font file in various embodiments can then be included with the movie, together with the text information, and multiplexed in a way that makes them extractable by a de-multiplexer hardware and/or software module in a decoding system.

Figure 2A:
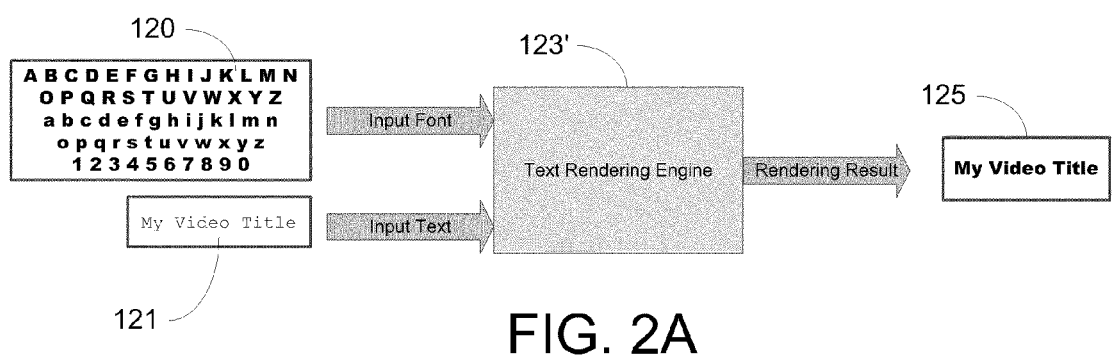
FIGS. 2A-B are block diagrams of a conceptual font file rendering process in accordance with various embodiment of the present invention.
Figure 2B:
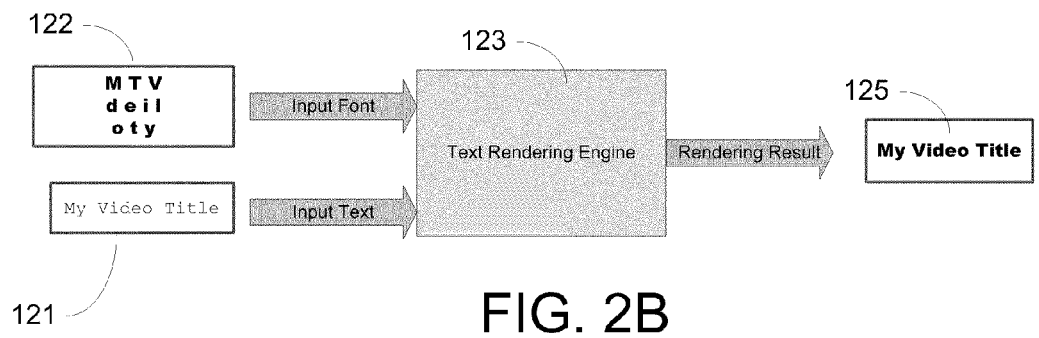

In FIGS. 2A-B, a generalized conceptual illustration of an optimized font file and rendering process versus an un-optimized font file rendering process are shown. As shown in the illustrated example, the optimized font file 122 is limited to the characters to the video title 121 and thus is smaller in size than the un-optimized font file 120. Also, the text rendering engine 123 utilizing the optimized font file 120 would require less memory to render the text and/or possibly provide a faster rendering result 124 and displayed video title 125 as compared to the text rendering engine 123' utilizing the un-optimized file 120.

Figure 3:
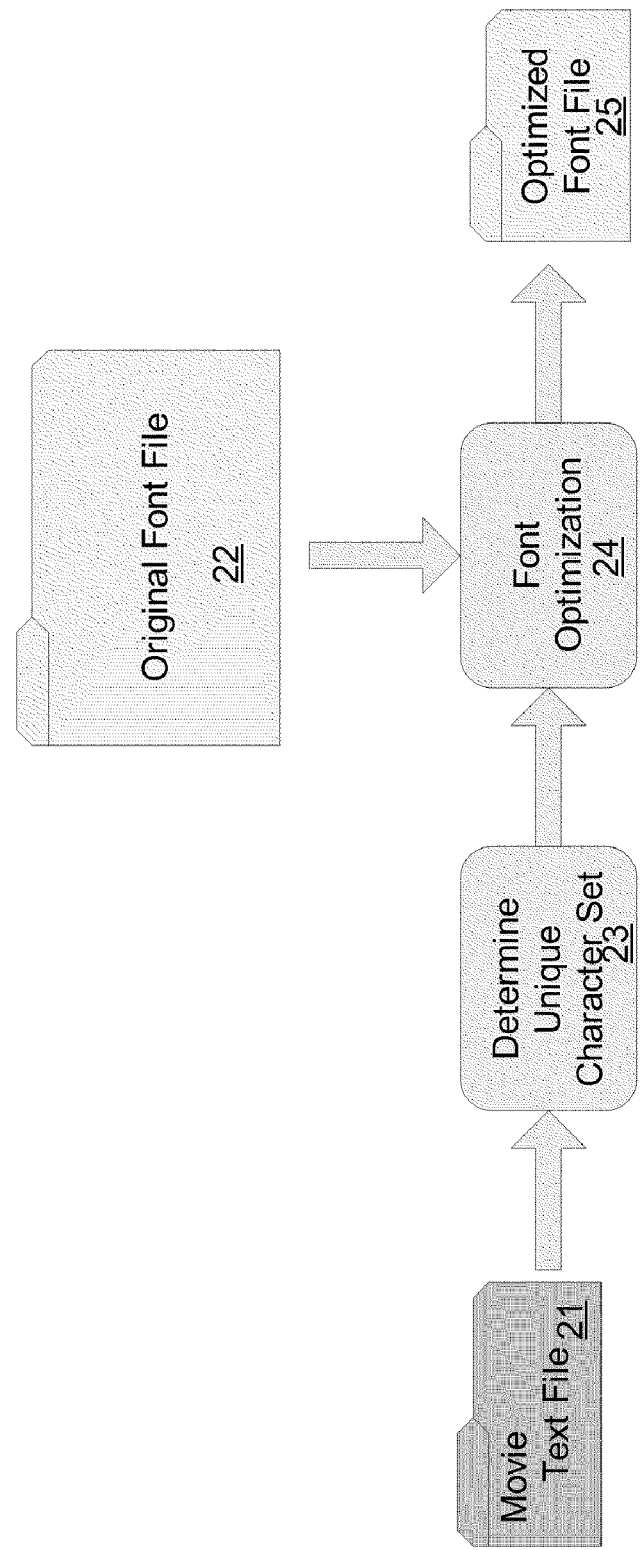
FIG. 3 is a block diagram of a multimedia textual information generation process in accordance with various embodiments of the present invention.

Referring now to FIG. 3, one embodiment of a process or system to generate an optimized file is shown in which, a text file 21 for a multimedia presentation, e.g., a movie, is analyzed by an encoder/decoder to determine a unique character set for the specific movie as defined by the text file 21. An original font file 22 provided from the multimedia file or otherwise stored or accessible by the encoder/decoder is applied to the unique character set for font optimization 24 thereby generating one or more optimized font files 25.

Figure 4:
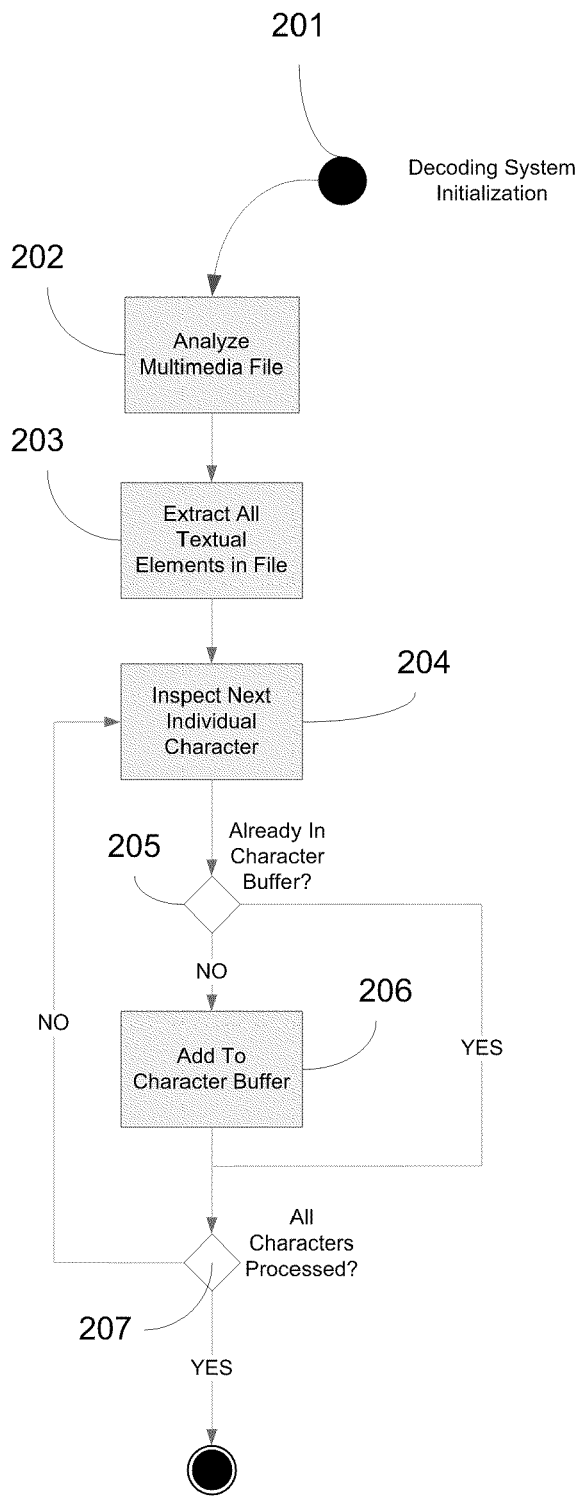
FIG. 4 is a flow diagram of a character set determination process in accordance with various embodiments of the present invention.

In FIG. 4, the unique character set is determined in one embodiment by initializing the decoding system (201). The multimedia file is analyzed (202) and all textual elements in the file are extracted (203). The first individual character is inspected or the next individual character is inspected (204), if the first character has been inspected. If the inspected character is in the character buffer (205), the process checks if all the characters have been processed (207). If so, the process ends with a unique character set being generated. If the inspected character is not in the character buffer, the character is added to the character buffer (206). If all the characters have been inspected (207), then the process ends with a unique character set being generated. Otherwise, the next individual character is inspected (204) to repeat the process.

It should be appreciated that while FIGS. 2-4 illustrates the creation of an optimized font for the subtitles, the system or process can be used or repeated for a combination of all other elements in the movie that require the communication of information via a textual representation to the viewer. In one embodiment, the accumulation of individual optimization processes can be finalized by the combining the results into a single font representing all the textual elements of the movie, or alternatively several fonts can be created for each major category of textual information in the movie.

Figure 5:
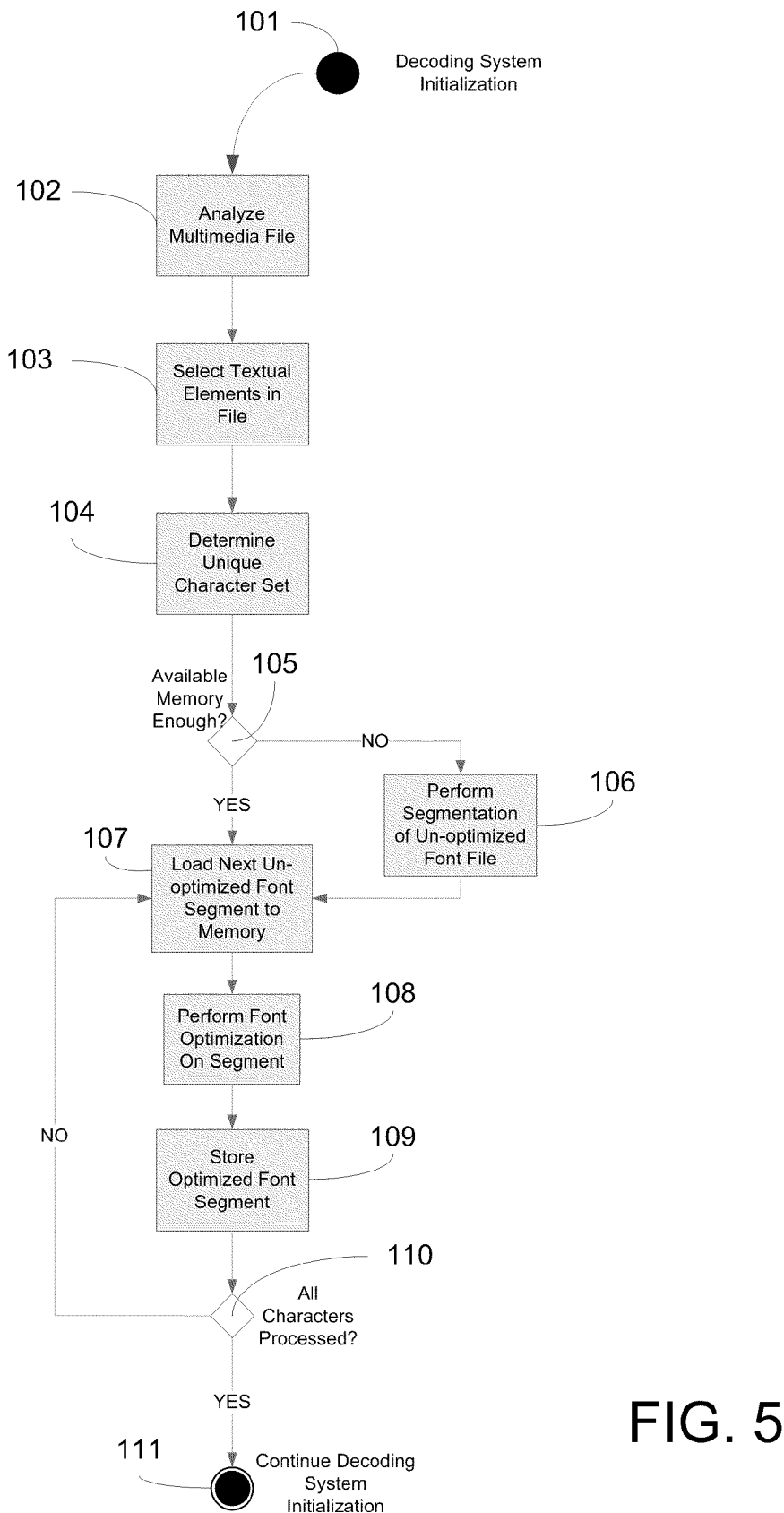
FIG. 5 is a flow diagram of an embedded font file optimization process in accordance with various embodiments of the present invention.

The process or system in one embodiment of FIGS. 2-4 may be realized in an authoring or post-production stage using Personal Computer or other Computer Workstations. Alternatively, the font optimization system or process may take place in an embedded device with a limited amount of dynamic memory and little or no amount of additional storage space (e.g. a hard-drive disk) as shown in FIG. 5. The amount of dynamic memory may be enough to hold the un-optimized font file completely when the system is in the initialization stage; alternatively, during the processing stage, the un-optimized font file may be segmented to accommodate a smaller dynamic memory size. The font optimization process will enable embedded systems to utilize a smaller amount of memory for holding the required font file. This memory optimization may be required to enable the video and audio decoder processes.

In FIG. 5, the decoding system is initialized (101) and the multimedia file analyzed (102). Textual elements in the multimedia file are selected (103) and a unique character set is determined (104). The amount of available memory as compared to the size of an un-optimized font file is determined (105). If enough memory is available, the un-optimized font file is loaded into memory (107) and font optimization is performed (108) to provide the fonts for the unique character sets. The optimized font file is stored (109) in its entirety, or according to the segmentation of the un-optimized font file. If all the characters are processed (110), the decoding system initialization continues (111). Otherwise, the process repeats loading the next un-optimized font segment in memory (107). If enough memory is not available, the un-optimized font file is segmented (106) and one or more segmented font files are thus loaded into memory (107).

Unified Font File

In various embodiments, an optimized font file can be used in cases where an existing font file(s) representing a desired character set is not present or where the accompanied font file has a better representation of the characters used by the movie. For example, some systems may host native fonts which aim at representing a majority of languages that are presented to them. However, the amount of memory required to make a sufficient and accurate representation of the character sets from different languages may be overly burdensome. As a result, certain character sets may be unified in the font file, leading to the undesirable effect of having character representations from one language displayed when the same character appears in a different language, for example, elements of the written Chinese characters which appear in both Japanese and Korean writing, but where each character should be represented with a glyph appropriate to the particular language. Therefore, by generating optimized font files tailored to a specific multimedia presentation that sufficiently and accurately represent the character sets from different languages the amount of memory occupied by such font files is significantly reduced as compared to the original host native font files. Accordingly, the use of unified font files and thereby their undesirable effects can be avoided. It should however be appreciated that unified font files can also be optimized and thus reduced in file size in cases where unified font files are acceptable or further reduction in file size is desired.

Memory and Timing

Figure 6:
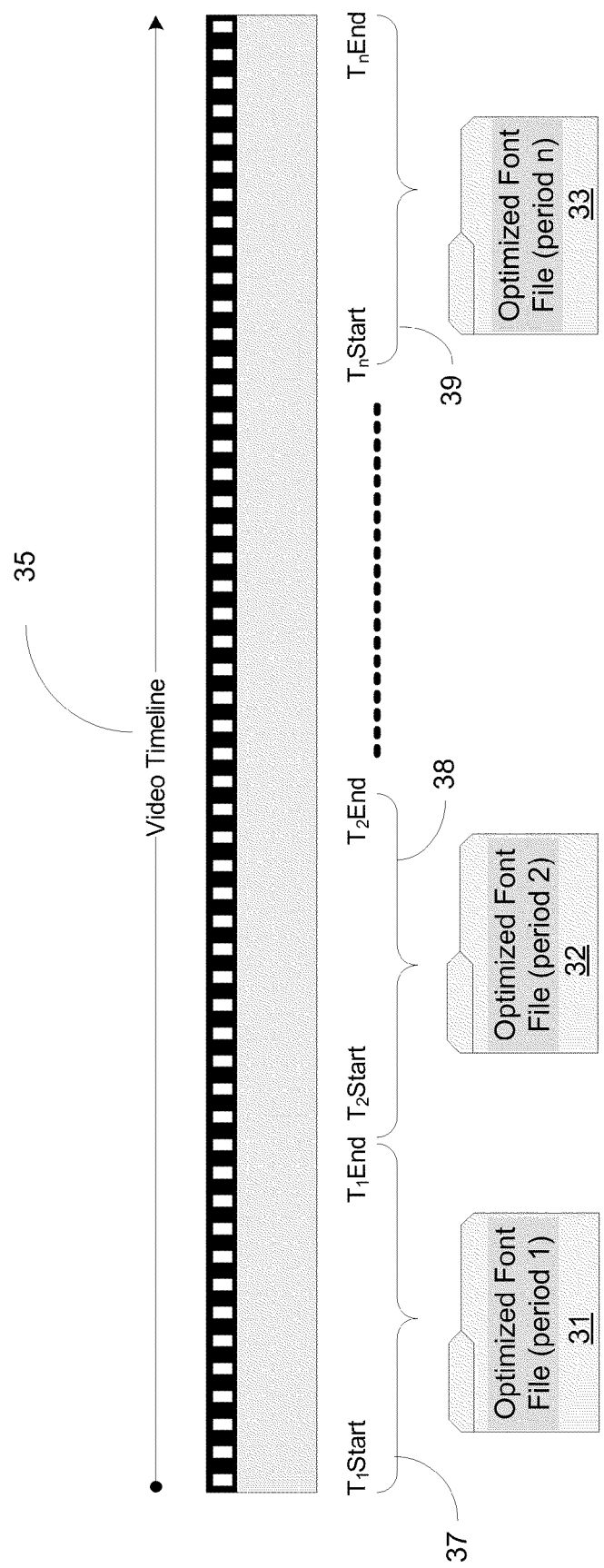
FIG. 6 is a graphical representation of font files relative to a given multimedia timeline in accordance with various embodiments of the present invention.

The font optimization system and process can also be extended to satisfy various memory and/or timing conditions for various systems. In such embodiments, the font optimization includes a limitation on the maximum size of the font file. As a result, the font file may only partially represent the textual information of the multimedia presentation. For example, in FIG. 6, multiple font files 31, 32, 33 are associated with the overall timeline 35 of a video presentation in which the textual information, such as subtitles, spans a specific timeline or time segments of the video presentation. Start and end time-code values 37, 38, 39 are used to associate the font files with the textual information of the movie for a particular time segment.

If it is desirable that the font files all be of an approximate equal size, then the time covered by a font file may vary, e.g., one font file may cover a time period longer than another font file, depending on the amount of conversation occurring as well as the number of unique characters representing those conversations. It may also be desirable to create font files such that they all span an approximately equal amount of time in a movie. In this case, the font files may have different file sizes. A hybrid approach could also be used, where a maximum font file is selected over a fixed time period, and for other time periods the font files are smaller in size. It should be appreciated that there may be exceptions in the uniformity of the font file sizes and/or their time spans depending on their location in the movie and the alignment of the subtitles with respect to the overall video timeline.

The exact representation of fonts in any specific multimedia container standard may differ greatly. One such multimedia standard known as Matroska has provisions for attaching font files and allowing pre-defined elements to specify the association of those attachments with a particular multimedia track such as subtitles. Utilizing the description of this standard for associating a single font to a subtitle track, the same identification mechanism (AttachmentLink) in a Track element may be repeated multiple times to associate multiple fonts with the Track containing the subtitle data. Additionally, an AttachmentStartTime field and AttachmentEndTime field may be added to the description of each individual attachment (AttachedFile) to denote the start and end times for which a font shall be utilized for the rendering of textual elements of a particular subtitle track. Some embodiments may associate a single font file for use by the movie, where AttachmentStartTime may be set to zero and AttachmentEndTime may be set to the time reflecting the entire duration of the movie.

The same standard may not have a specific way of associating other textual elements of the file (such as the movie title or track names) that are not part of the multimedia track hierarchy with a specific font. In many multimedia standards, metadata associated with a file or portion of a file provides descriptive information about the contents of the file or portion of the file. One way to associate metadata as metadata tags with a file under the Matroska specification is the Matroska Tag mechanism. Tags can contain descriptive information or attributes associated with the file. In a hierarchical arrangement, a nested Tag becomes an attribute of the base tag. In one embodiment, with respect to the Matroska specification or format, the association of textual information of the file with an attached font file can be specified in the following manner:

```
+Tags
  +Tag
    +SimpleTag
      TagName=Font
      TagLanguage=jpn
      TagBinary=Optimized Font
    +Tag
      +SimpleTag
        TagName=SUMMARY
        TagLanguage=jpn
        TagString="a lot of text"
```

In the above description, the optimized font file is described by a hierarchy of a base Tag element associating an optimized font with a series of textual elements which use the existing Matroska Tag mechanism. In this scheme, the font file is described by the first SimpleTag element as shown above, and the actual binary data of the font may be encapsulated as a TagBinary field. The subsequent Tag elements following the first SimpleTag structure may be used to host all the textual elements related to this particular font description. A second Tag element appearing as the immediate child of the parent Tags may be used to host a second font file and associated textual elements, following the same hierarchical structure.

While the above description contains many specific embodiments of the invention, these should not be construed as limitations on the scope of the invention, but rather as an example of one embodiment thereof. Accordingly, the scope of the invention should be determined not by the embodiments illustrated, but by the appended claims and their equivalents.

The invention claimed is:

1. A method of generating at least one font file customized to a specific multimedia file that includes textual elements, the method comprising:

receiving a multimedia file including audio data, video data, and a track containing subtitle textual elements and a corresponding original font file by a processor;

identifying a plurality of time segments within the multimedia file including audio data, video data, and associated textual elements using the processor;

generating a unique character set for each time segment including each of the characters in the textual elements associated with the time segment;

generating at least one modified font file for each time segment including fewer characters than the original font file, and all of the characters in the unique character set associated with the time segment, by the processor, wherein each modified font file is specifically matched to the textual elements associated with an identified time segment;

marking each modified font file to signify a time period during the playback of audio data and video data in which the modified font file is dynamically accessible within the memory of a playback device for rendering associated textual elements; and incorporating the modified font files into the multimedia file.

2. The method of claim 1 wherein the textual elements in the corresponding portion of the multimedia file include a plurality of characters and the generated at least one modified font file contains representations that only match the plurality of characters.

3. The method of claim 2 wherein the textual elements in the corresponding portion of the multimedia file additionally include a plurality of predetermined characters and the generated at least one modified font file contains representations that only match the plurality of the characters and the plurality of predetermined characters.

4. The method of claim 1 wherein the generated font file is smaller in file size than the original font file.

5. The method of claim 1 wherein generating the at least one modified font file further comprises determining an amount of memory available to process the font file and segmenting the original font file such that each segment can fit into the amount of available memory as it is processed.

6. The method of claim 1 wherein the generated font file is not guaranteed to be useable for another multimedia file different from the received multimedia file.

7. The method of claim 1 wherein the generated font file is useable only for the received multimedia file.

8. The method of claim 1 further comprising rendering textual information for display by using the textual elements and the generated font file.

9. The method of claim 1 further comprising associating at least one video track with the at least one modified font file.

10. The method of claim 1 further comprising associating a hierarchy of tags with a plurality of textual elements and a generated font file.

11. The method of claim 1 further comprising associating a single modified font file with an identified time segment, spanning the entire duration of the movie.

12. The method of claim 1 further comprising associating each modified font file with each identified time segment.

13. The method of claim 1 wherein the plurality of time segments collectively corresponds to an overall timeline of a video presentation.

14. The method of claim 13 further comprising tracking the overall timeline and rendering subtitle information at specific time periods using only a modified font file that corresponds to the time segment associated with the tracked timeline.

15. The method of claim 1 further comprising rendering textual information for display by using the text data and the plurality of font files.

16. The method of claim 1 wherein the textual elements includes a plurality of characters and the generated font files collectively contain representations that only match the plurality of characters.

17. The method of claim 1 further comprising associating at least one track in the multimedia file with a generated font file.

18. The method of claim 1 further comprising associating at least one track in the multimedia file with several font files simultaneously.

19. The method of claim 1 further comprising associating at least one tag in the multimedia file with a textual element that is not a subtitle.

20. The method of claim 1, wherein each modified font file is marked with start and end time-code values.

21. The method of claim 1, wherein each of the at least one modified font files is described using a first tag element within the multimedia file and subsequent tag elements following the first tag element are used to host all the textual elements with which the modified font file is associated.

22. A method of generating textual information for a multimedia file, the method comprising:
receiving text data, an original font file and a multimedia file having audio and video data by a processor;
generating an optimized font file from the text data and the original font file by the processor, the generated font file being specifically matched to the text data and different from the original font file; and
associating at least one metadata tag in the multimedia file with a textual element of the text data that is not a subtitle.

23. A textual information rendering system for generating textual information for a multimedia file, the system comprising:
a demultiplexer configured to extract text data from a multimedia file including audio data, video data, and a track containing subtitle textual elements;
a processor configured to:
identify a plurality of time segments within the multimedia file;
generate a unique character set for each time segment including each of the characters in the textual elements associated with the time segment;
generate at least one modified font file for each time segment including fewer characters than the original font file, and all of the characters in the unique character set associated with the time segment, wherein each modified font file is specifically matched to the textual elements associated with an identified time segment;
mark each modified font file to signify a time period during the playback of audio data and video data in which the modified font file is dynamically accessible within the memory of a playback device for rendering associated textual elements; and
incorporate the at least one modified font file into the multimedia file; and
memory coupled to the processor and storing the at least one modified font file.

24. The system of claim 23 further comprising:
a video decoder module integrated with the processor and configured to decode the video data;
an audio decoder module integrated with the processor and configured to decode the audio data; and
a text rendering engine configured to decode the extracted text data and to display text information by utilizing one of the at least one modified font files and the decoded text data.

25. The system of claim 23 wherein the processor segments the original font file prior to storing the original font file.

* * * * *